United States Patent
Harrell, Jr.

(10) Patent No.: US 10,213,689 B2
(45) Date of Patent: Feb. 26, 2019

(54) METHOD AND SYSTEM MODELING SOCIAL IDENTITY IN DIGITAL MEDIA WITH DYNAMIC GROUP MEMBERSHIP

(71) Applicant: Massachusetts Institute of Technology, Cambridge, MA (US)

(72) Inventor: Douglas Alan Harrell, Jr., Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 640 days.

(21) Appl. No.: 14/677,378

(22) Filed: Apr. 2, 2015

(65) Prior Publication Data

US 2015/0286276 A1    Oct. 8, 2015

Related U.S. Application Data

(60) Provisional application No. 61/973,960, filed on Apr. 2, 2014.

(51) Int. Cl.

| | | |
|---|---|---|
| *A63F 13/55* | (2014.01) | |
| *A63F 13/79* | (2014.01) | |
| *G06F 17/30* | (2006.01) | |
| *A63F 13/58* | (2014.01) | |
| *G06F 3/01* | (2006.01) | |
| *A63F 13/795* | (2014.01) | |

(Continued)

(52) U.S. Cl.
CPC ............. *A63F 13/55* (2014.09); *A63F 13/58* (2014.09); *A63F 13/79* (2014.09); *A63F 13/795* (2014.09); *A63F 13/822* (2014.09); *G06F 3/011* (2013.01); *G06F 17/30699* (2013.01); *G06Q 50/01* (2013.01); *A63F 2300/5546* (2013.01); *A63F 2300/5553* (2013.01); *A63F 2300/65* (2013.01); *A63F 2300/807* (2013.01); *H04L 51/32* (2013.01); *H04L 67/306* (2013.01)

(58) Field of Classification Search
None
See application file for complete search history.

(56) References Cited

U.S. PATENT DOCUMENTS

| | | |
|---|---|---|
| 5,885,156 A | 3/1999 | Toyohara et al. |
| 6,106,395 A | 8/2000 | Begis |

(Continued)

FOREIGN PATENT DOCUMENTS

WO    2013/013281 A1    1/2013

OTHER PUBLICATIONS

Ian Lustick; PS-I: A User-Friendly Agent-Based Modeling Platform for Testing Theories of Political Identity and Political Stability; Journal of Artificial Societies and Social Simulation vol. 5, No. 3; Published: Jun. 30, 2002.

Rebecca A. Grier, Bruce Skarin, Alexander Lubyansky, Lawrence Wolpert; SCIPR: A Computational Model to Simulate Cultural Identities for Predicting Reactions to Events; Proceedings of the Second International Conference on Computational Cultural Dynamics; Sep. 2008.

(Continued)

*Primary Examiner* — Jason Yen
(74) *Attorney, Agent, or Firm* — Peter A. Nieves; Sheehan Phinney Bass & Green PA

(57) ABSTRACT

A method for modeling a virtual identity in a digital media system is disclosed. A plurality of categories are defined according to identity characteristics of a virtual identity. A degree of a membership is modeled in a category for members of the category, wherein each category includes a plurality of features. Changes to membership are simulated, wherein the degree of membership includes a gradient value in a category feature over time.

20 Claims, 11 Drawing Sheets

(51) Int. Cl.
  *A63F 13/822* (2014.01)
  *G06Q 50/00* (2012.01)
  *H04L 12/58* (2006.01)
  *H04L 29/08* (2006.01)

(56) References Cited

U.S. PATENT DOCUMENTS

| | | | |
|---|---|---|---|
| 6,287,196 B1 | 9/2001 | Kawano | |
| 8,090,665 B2 | 1/2012 | Yang et al. | |
| 8,626,835 B1 | 1/2014 | Gyongi et al. | |
| 9,117,316 B1* | 8/2015 | Crutchfield, Jr. | G06T 13/205 |
| 2004/0143852 A1 | 7/2004 | Meyers | |
| 2004/0235544 A1* | 11/2004 | Horigami | A63F 13/10 463/8 |
| 2007/0032282 A1* | 2/2007 | Hamamoto | A63F 13/10 463/9 |
| 2009/0276707 A1* | 11/2009 | Hamilton, II | G06F 3/04847 715/716 |
| 2010/0056236 A1* | 3/2010 | Rhyne, IV | A63F 13/00 463/1 |
| 2013/0143669 A1 | 6/2013 | Muller | |
| 2013/0311556 A1 | 11/2013 | Srivastava et al. | |
| 2014/0038708 A1* | 2/2014 | Davison | A63F 13/12 463/31 |
| 2014/0160149 A1* | 6/2014 | Blackstock | G06N 3/006 345/619 |

OTHER PUBLICATIONS

Jonathon Kopecky, et al; Social identity modeling: past work and relevant issues for socio-cultural modeling; Proceedings of the 19th Conference on Behavior Representation in Modeling and Simulation, Charleston, SC, Mar. 21-24, 2010.

Harrell, D. F., Kao, D., & Lim, C. U.; (2013); Computationally Modeling Narratives of Social Group Membership with the Chimeria System Proceedings of the 2013 Workshop on Computational Models of Narrative (CMN2013), A satellite workshop of CogSci 2013: The 35th meeting of the Cognitive Science Society, Berlin, Germany, Jul. 31-Aug. 3, 2013.

Harrell, D. F., Kao, D., Lim, C. U., Lipshin J., Sutherland A. (2014) Stories of Stigma and Acceptance Using the Chimeria Platform. "Hold the Light," Conference of the Electronic literature Organization (ELO2014), Jun. 19-Jun. 21, 2014; 2 pp.

Harrell, D. F., Kao, D., Lim, C. U., Lipshin J., Sutherland A. (2014) The Chimeria Platform: User Empowerment through Expressing Social Group Membership Phenomena. The Digital Humanities Conference (DH2014), Lausanne, Switzerland. 7 pp.

Harrell, D. F., Kao, D., Lim, C. U., Lipshin J., Sutherland A., Makivic J., & Olson D. (2014) Authoring Conversational Narratives in Games with the Chimeria Platform. Foundations of Digital Games 2014 (FDG2014) Ft. Lauderdale, FL, USA. Apr. 4-6. 8pp.

International Search Report and Written Opinion for PCT/US15/24077, dated Aug. 27, 2015.

* cited by examiner

| Game | Modeled Character Features | Methods Used for Varying Conversation or Story Progression Based on Character Features (Grayed-out cell indicates method is not used) | | | | Summary of Identified Limitations |
|---|---|---|---|---|---|---|
| | | TXT-SUB | DLG-TRS | ACT-AVL | STR-PRG | |
| The Elder Scrolls V: Skyrim | Gender | X | | | | *Only a subset of modeled character features are used<br><br>*Intersections between character features are not considered |
| | Race | | X | X | | |
| | Skill Attributes | | | | | |
| | Visual Appearance | | | | | |
| Mass Effect 3 | Gender | X | | | X | *World views by NPCs are shared and singular<br><br>*Availability of actions for players are based only on one chosen feature |
| | Morality | | X | X | X | |
| | Class | | | | | |
| | Skill Attribute | | | | | |
| | Character Profile | | | | | |
| Diablo 3 | Gender | X | | | | *Social structures between characters are immutable and predetermined by designers |
| | Class | X | X | | | |
| | Skill Attributes | | | | | |

Method Keys TXT-SUB: Text Substitutions, DLG-TRS: Dialog Trees, ACT-AVL: Action Availability, STR-PRG: Story Progression

FIG. 1
(PRIOR ART)

Prototypical Brushwood 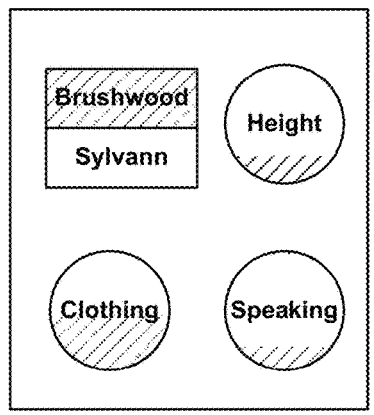 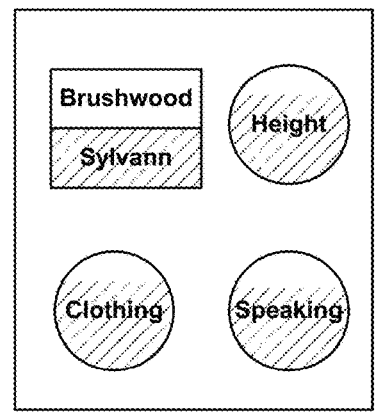 Prototypical Sylvann
FIG. 7B          FIG. 7C
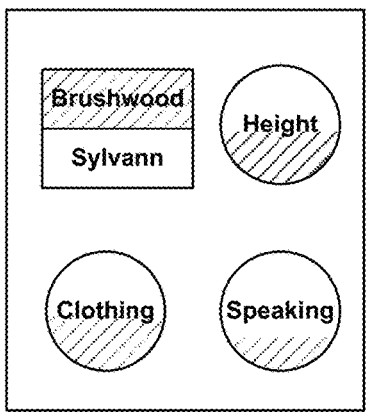 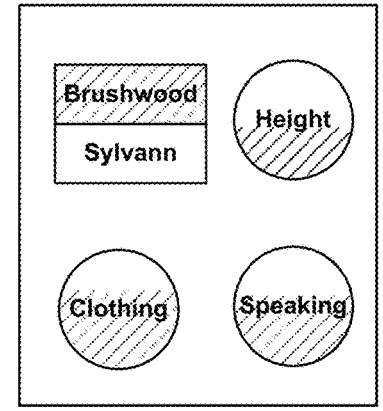
FIG. 8A          FIG. 8B

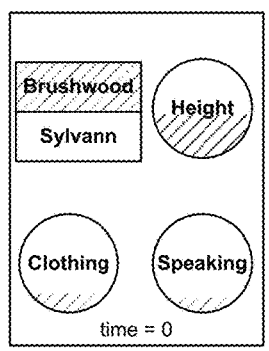 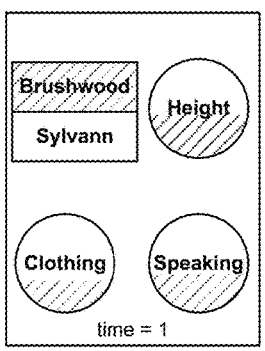 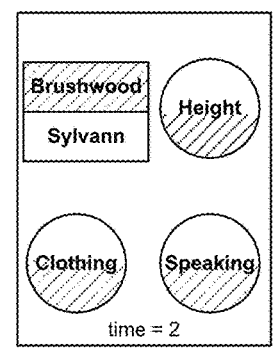 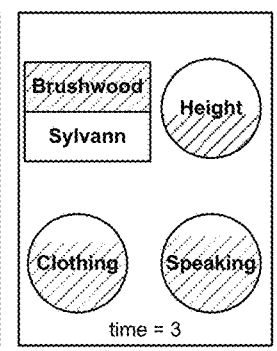
FIG. 9A    FIG. 9B    FIG. 9C    FIG. 9D
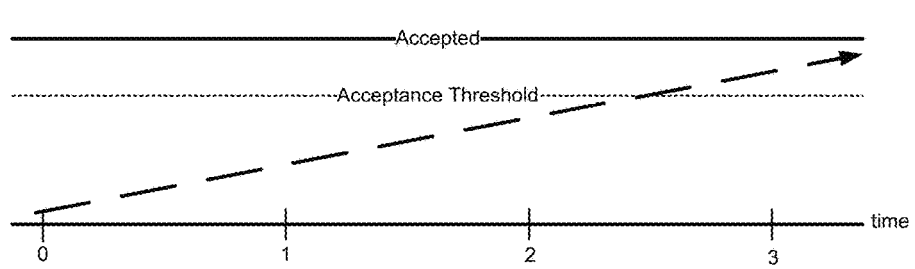
FIG. 9E

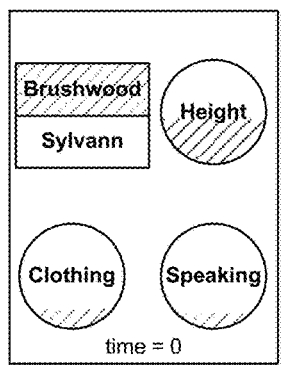 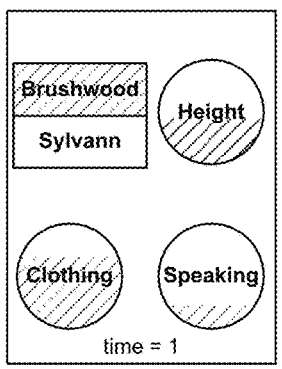 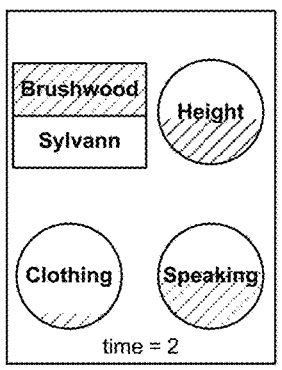 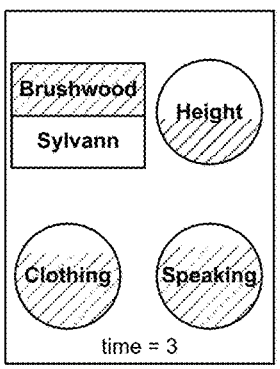
FIG. 10A  FIG. 10B  FIG. 10C  FIG. 10D
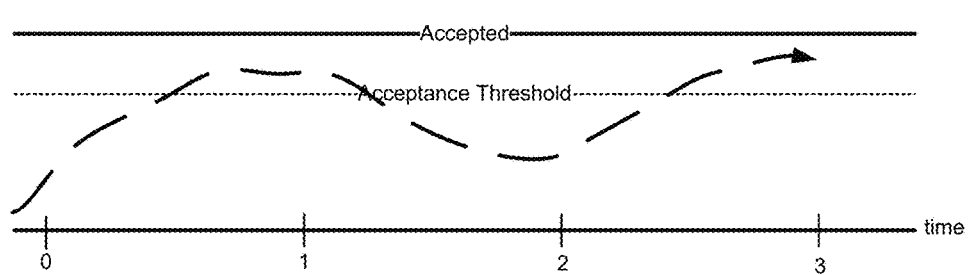
FIG. 10E

METHOD AND SYSTEM MODELING SOCIAL IDENTITY IN DIGITAL MEDIA WITH DYNAMIC GROUP MEMBERSHIP

CROSS-REFERENCE TO RELATED APPLICATIONS

This application claims the benefit of U.S. Provisional Patent Application Ser. No. 61/973,960, filed Apr. 2, 2014, entitled "An Approach to Modeling Social Identity using Dynamic Group Membership for Use in Digital Media Such as Videogames and Social Media," which is incorporated by reference herein in its entirety.

GOVERNMENT STATEMENT

This invention was made with government support under Grant No. IIS-1064495 awarded by the National Science Foundation. The government has certain rights in the invention.

FIELD OF THE INVENTION

The present invention relates to digital media, and more particularly, is related to modeling of social dynamics.

BACKGROUND OF THE INVENTION

Computational modeling of social categories can be found in a wide range of digital media works. Computational models of social categories are used in a range of implementation of virtual identities, here defined as avatars, game characters (both user and computer controlled), accounts, and profiles. Aspects of the implementations of these virtual identities are not visible to users (e.g., user preference information computed on the back-end to recommend purchases in e-commerce sites or to display ads; information to determine success of actions such as opening a locked door or attacking in games). For example, within computer role-playing games (RPGs), racial categorization is often used to style the visual appearance of an avatar of a player or to trigger different predetermined ("canned") reactions when conversing with a non-player character (NPC). In social media, users might join groups based on shared taste or categorize each other into groups such as "colleagues" or "family members" using privacy settings. However, in most such systems, category membership is determined in a top-down fashion. Members are often slotted into single, homogeneous groups, with no possibility for hybrid identities, identities that exist at the margins of groups, or identities that change over time. Taken holistically, such approaches have many limitations. These deficiencies are particularly visible when trying to accurately model the nuance of social category membership in the real world.

As an example, socially nuanced conversations that take into account real-world identity phenomena have not yet been extensively modeled within prior art games. FIG. 1 is a table illustrating three prior art approaches of relating character attributes to alternative game outcomes.

Text-substitution (TXT_SUB) refers to the use of pre-authored text templates with one or more words capable of being replaced depending on a specific character feature such as gender or race, and the context of use. For instance, in the game Elder Scrolls V: Skyrim a word referring to the race of the character, such as "Nord," might be replaced with a word referring to another race such as "Breton" when the player-character (PC) is addressed. Similar textual changes are often made to comments made in passing by non-player characters to the PC when they are not engaged in conversation. Another method of conversation variation used is the replacement of entire clauses (rather than single words) in dialogue trees (DLG_TRS). However, such text-replacement is also often dependent upon only a single feature of the PC. A third variation method used is conversation action availability (ACT_AVL), which refers to using specific modeled character features as a means of selecting which choices and actions are available to the PC. Finally, story progression (STR_PRG) may be affected by specific character features. For example, in Skyrim, availability of a particular quest can be decided based on a player's character race. Playing as the "Orsimer" race allows a PC immediate access into a restricted area, whereas playing as a different race requires the completion of a prior task.

In sum, these are highly limited ways of taking character identities into account. Most conversations in such games do not dynamically progress based on the NPC's impression of the PC's identity during the interaction, nor take into account multiple features of PC identity (a phenomenon known in the humanities as "intersectionality" in identity). They do not take into account partial membership in categories or the trajectory of identity over time. They also do not address the issue of generating alternate dialogue based on character identity robustly. Therefore, there is a need in the industry to address one or more of the abovementioned shortcomings.

SUMMARY OF THE INVENTION

Embodiments of the present invention provide a system and methods for modeling social identity in a digital media system with dynamic group membership. Briefly described, the present invention is directed to a method for modeling a virtual identity in a digital media system. A plurality of categories are defined according to identity characteristics of a virtual identity. A degree of a membership is modeled in a category for members of the category, wherein each category includes a plurality of features. Changes to membership are simulated, wherein the degree of membership includes a gradient value in a category feature over time.

A second aspect of the present invention provides a method for simulating a narrative structure in a digital media system environment. A baseline is established for the narrative including a storyworld and a sub-story associated with a first virtual identity. A plurality of character identity categories are defined according to identity characteristics of the first virtual identity. A degree of a membership in a category is modeled for the first virtual identity, wherein each category includes a plurality of features. A second virtual identity interacts with the first virtual identity. The reaction of the second virtual identity to an action of the first virtual identity is determined based at least in part on the degree of the membership in the category. A narrative branch is selected from a plurality of branches within the narrative a result of the reaction of the second virtual identity.

Described in architecture, a third aspect of the present invention, provides a digital media system modeling social categories for a virtual identity. An engine has a processor and a memory configured to execute steps, including defining a plurality of categories according to identity characteristics, and modeling a degree of a membership in a category for members of the category. Each category includes a plurality of features simulating changes to the membership, where a degree of membership includes a gradient value in a category feature, an application interface with a visual representation of user interaction and category membership changes, and an epistemology configured to store and retrieve the features of the category.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

FIG. 1 is a table listing three prior art approaches of relating character attributes to alternative game outcomes.

FIG. 7B is a block diagram illustrating gradients of a first prototype within the exemplary category of FIG. 7A.

FIG. 7C is a block diagram illustrating gradients of a second prototype within the exemplary category of FIG. 7A.

FIG. 8A is a block diagram illustrating gradients of a first character with features intermediate between the first prototype and the second prototype.

FIG. 8B is a block diagram illustrating gradients of a second character with features intermediate between the first prototype and the second prototype.

FIGS. 9A-9D are block diagram illustrating gradients of a character illustrating gradients of features within the category of FIG. 7A at times 0, 1, 2, and 3.

FIG. 9E is a graph showing a first acceptance trajectory for the character of FIGS. 9A-9D.

FIGS. 10A-10D are block diagram illustrating gradients of a character illustrating gradients features within the category of FIG. 7A at times 0, 1, 2, and 3.

FIG. 10E is a graph showing a second acceptance trajectory for the character of FIGS. 10A-10D.

DETAILED DESCRIPTION

Figure 2:
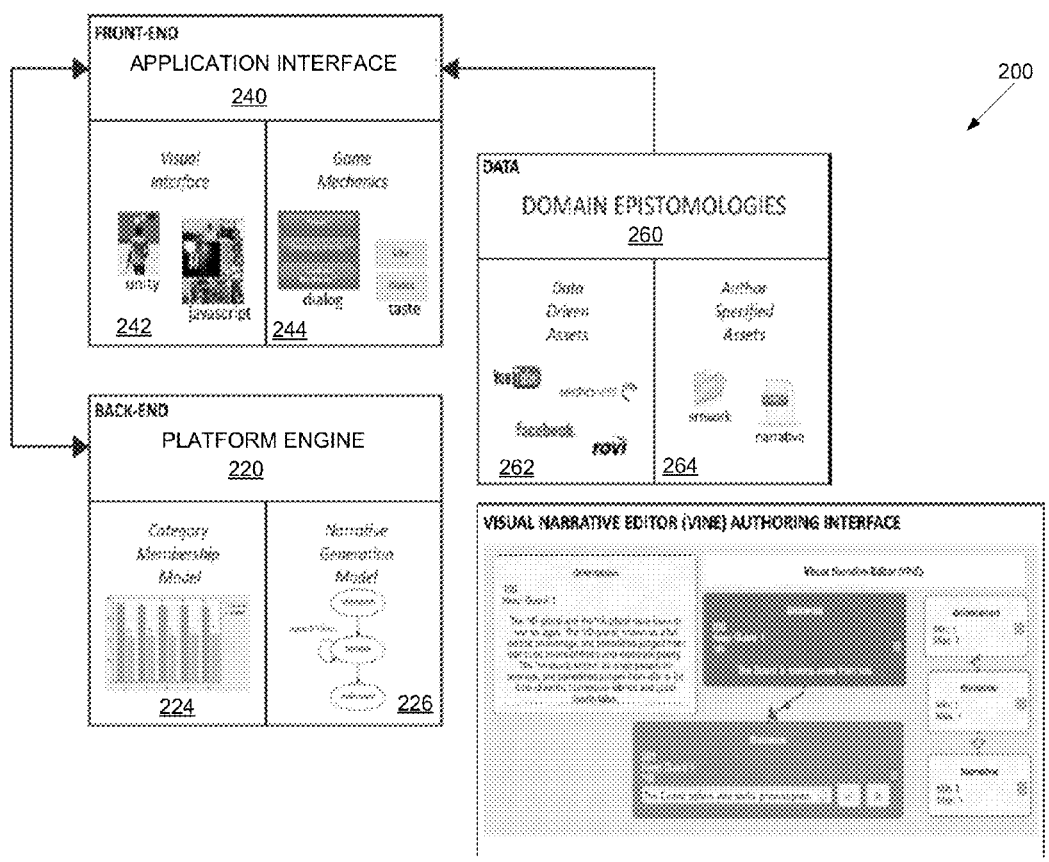
FIG. 2 is a block diagram of an exemplary system for modeling character identity.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

As used within this disclosure, a "digital media system" refers to a computer modeled environment, for example, a virtual reality system, a virtual world such as a chat room, a video game, or a virtual common space. Such a system may be locally hosted, cloud based, and/or distributed.

As used within this disclosure, a "virtual identity" refers to part of an interface that represents a user or a machine instantiated character in a digital media system.

An "avatar" is a virtual identity displayed and/or controlled by users in applications not limited to games, for example, 3D graphical representations in virtual world or virtual reality (VR) systems, 2D images accompanying profiles or posts on forums, or portraits used in social media.

As used within this disclosure, an "account" refers to a collection of data associated with a user of an e-commerce or media site. An account is generally associated with the user via a username, and protected, for example, by a password. At least a portion of the account data is generally private to the user and the administrator of the site or social media venue. Similarly, a social media site may term such a collection of data as a "profile," which as used herein refers to a collection of preferences and/or associations of the user, based, for example, on information entered by the user, or determined by actions and/or interactions of the user with other user. Both accounts and profiles may be used to categorize users and record their virtual identities using, for example, similar combinations of text fields, stats, image files, graphics, and some kind of rules of operation.

As used within this disclosure, a "player character" (PC) refers to a virtual identity character controlled by a human participant ("user"), for example, in a role playing game (RPG) or social media venue. Similarly, a "non-player character" (NPC) refers to a machine controlled virtual identity capable of some level of interaction with a PC. While the terms PC and NPC are used herein within embodiments referring to RPGs, the usage of these terms are not intended to limit the invention to RPGs, but rather are used as exemplary embodiments of the broader concept of virtual identity, which is applicable in other applications.

As used within this disclosure, a "modeling category" refers to an aspect of the identity of a PC that contributes to the abilities and expected behavior of the character, as well as influencing the reactions of the media work, for example NPCs interacting with the PC or events being triggered in a virtual world. A prototypical member of a modeling category is defined via a set of features.

As used within this disclosure, a "modeled character feature" refers to an identity characteristic of a virtual identity within a modeling category that may impact interactions with other virtual identities, for example, interactions between a PC and an NPC. The height, clothing, and manner of speaking of a character are examples of features of a category.

As used within this disclosure, a "worldview" refers to an attitude and/or point of view of a virtual identity, such as a PC or NPC, which may change over time based on behavior of one or more PCs and/or the interaction between a PC and an NPC. More generally, worldview is a particular instantiation of abstract categories with concrete categories (see below) along with specification of the membership functions and thresholds. Worldviews can be used to define different conditions in which the system responds to the virtual identity differently. For example, worldview can establish a point of view of a PC or NPC. However, worldview can also be used to define the reactions of a set of other virtual identities, e.g., all NPCs in a particular store or more broadly in a particular town or country. Worldview may also be used to set conditions for responding to virtual identities in non-game settings. For example, a music recommender system under a worldview in which classical music is assigned to a higher abstract category and rock is assigned to a lower abstract category would give different recommendations to a user whose profile is found to be within the musical threshold for the "classical music" fan concrete category. The worldview of a character may influence how one virtual identity acts/reacts when interacting with another virtual identity, in addition to the category memberships of one or more of the interacting identities.

As used within this disclosure, "closeness value" is a measure of a degree to which a virtual identity deviates from a prototypical member of a modeling category.

As used within this disclosure, "epistemology" refers to an ontology (database/knowledge base) that describes cultural knowledge and beliefs. An epistemology includes knowledge representations describing modeling categories. An epistemology may be external systems/services like the allmusic guide (RoviCorp cloud services) or may be specifically made for a particular application.

As used within this disclosure, "category membership" refers to a degree of membership of an individual (character) in any modeling category within the system.

As used within this disclosure, "naturalization trajectory" refers to changes of category membership over time of individuals modeled by the system. For example, a naturalization trajectory may be implemented as a data structure tracking and storing a log of all changes of category membership over time.

As used within this disclosure, a "category" is defined by a set of features/attributes shared in varying degrees by category members.

As used within this disclosure, an "abstract category" is the first of two primary types of social modeling categories. An abstract category represents a generic social structure. For example, a binary abstract category may include an elite category and an oppressed category, or a peaceful category and a warlike category.

As used within this disclosure, a "concrete category" is the second of two primary types social modeling categories. A concrete category generally includes one or more static features of a PC that are not generally affected by the behavior of the character. The concrete category may also include one or more dynamic features, which may be impacted by actions of the PC. A concrete category includes a set of features shared by most or all members of the category. For example, a class concrete category may include net worth, gender, race, clothing owned, clothing worn now, et cetera. Concrete category features can have continuous values, such as a continuous range of colors defining skin tone, or discrete values, such as gender (male, female). Concrete categories are generally defined in terms of prototypical features. Membership is gradient, and is calculated according to a membership function and may be referred to as "degree of membership." The membership function can have a threshold above which the system responds to the virtual identity as a member of the category. That threshold can be reset to change during runtime, however.

As used within this disclosure, "dynamic group membership" refers to a change over time within categories and between categories, for example, in how an NPC interacts with a PC based on how the NPC perceives the PC in relation to members of a social modeling category. The dynamic group membership of a PC may be modeled as a trajectory. Dynamic group membership may be modeled using "membership functions," "category membership tests," and "naturalization trajectory tests," described further below.

Membership functions determine how quickly or slowly user actions result in changes to category membership. For example, consider using logarithmic function log n to describe increasing virtual identity membership based upon actions that change features to be more like those prototypical of a category. Membership would change more slowly than using an $n^2$ function or 2n function. A very useful approach used here is to define a "tunable sigmoid function."

A category membership test determines whether or not a virtual identity has passed a threshold beyond which the virtual identity would be considered to be a category member (under a particular worldview). It can be used, for example, to determine the response an NPC makes to a PC—one response for category members and another for non-members.

A naturalization trajectory test takes in the naturalization trajectory of a virtual identity and evaluates the shape of that trajectory. For example, a trajectory could be monotonically increasing in a particular category, monotonically decreasing, fluctuating and ending above a membership threshold, fluctuating and ending below a membership threshold, and so on. This can be used, for example, to vary NPC responses or game endings based on the trajectory. A PC whose trajectory has only increased in membership could be seen as "trying to pass" as a member of a different category or "becoming" a member of a different category. One potential ending could acknowledge this whereas other endings could acknowledge other naturalization trajectories.

Reference will now be made in detail to embodiments of the present invention, examples of which are illustrated in the accompanying drawings. Wherever possible, the same reference numbers are used in the drawings and the description to refer to the same or like parts.

Embodiments of the present invention address the limitations described in the Background section and create more nuanced social categorization models in digital media such as videogames, social networks, interactive stories, virtual worlds, and virtual reality systems in two primary ways: First by modeling the underlying structure of many social categorization phenomena with a platform engine; and second by enabling users to build their own creative applications about social categorization on top of the engine, using an application interface (API). The underlying engine allows for the movement of individuals within, between, and across social categories (such as from novice to expert or from marginalized to central). It also allows for some members to be more central to a group than others, to assimilate or naturalize in relation to a category, and to claim membership in multiple categories. Modeling these scenarios draws upon specific concepts culled from sociolinguistics, cognitive science, and sociology of classification. They include: category gradience, category dynamics, multiple memberships, inter-category relationships, and prototypes (described further in the theoretical framework below).

The theoretical framework refers to a method of computationally representing multiple kinds of categorization phenomena as described in sociolinguistics, cognitive linguistics, and the sociology of classification. The theoretical framework encompasses conversational narrative, cognitive characterization, and the sociology of stigma.

In many forms of everyday communication, conversational narrative conveyed between individuals under natural conditions provides a deep and satisfying sense of involvement. Exemplary embodiments of the method described herein generate conversational narratives according to a schema based in narrative theory, both in the ordering of clauses and the structure of the clauses themselves. Similarly, the schema models narratives in conversational storytelling. For example, story sequences are modeled where multiple members contribute individual stories toward the construction of a single, overarching narrative. References herein to "narrative" may refer to structures that order events or assets into some type of organizing structure experienced sequentially by users.

For example, within cognitive science, Mark Turner (1996) has described stories as dynamic interactions of events, actors, and objects, a minimal model aimed at capturing the skeletal pattern underlying everyday narrative imagining. This definition parallels the minimal literary theoretic definition provided by narrative theorist Manfred Jahn, in which stories are sequences of events involving characters, with events including both natural and non-natural happenings. Many models of narrative require this organizational structure to include both temporal (ordering in time) and causal (dependencies between events) structure. One of the major models of narrative implemented in the technology discussed here is based on William Labov's model of narratives of personal experience (in the field of sociolinguistics). Charlotte Linde's model of "life stories" builds upon this type of framework, as does another model of narrative implemented in the technology described here, Livia Polanyi's model of conversational narrative. The term "narrative generation" refers to the automatic artificial intelligence (AI) generation of these conversational narratives incorporated by the embodiments described further below. For example, Polanyi's proposed constraints may inform the computational models used in embodiments of a conversational narrative generation system.

Several cognitive models related to cognitive categorization are used in exemplary embodiments of the modeling system and methods. The notion of category gradience is an expansion upon earlier cognitive categorization approaches that consider category membership to be defined by a fixed set of characteristics. Instead, centrality gradience recognizes that some members are typically deemed to be better examples (prototypes) of a category than others, for example, as put forth by psychologist Eleanor Rosch, later extended by cognitive scientist George Lakoff. Centrality gradience describes how members which are within the category boundaries may be more or less central.

Category dynamics refers to the idea that changes to category membership can occur over time. As noted earlier, this may occur both within and across categories. It can also involve adding or removing new category memberships by adjusting degrees of membership in categories. In this way, multiple memberships are possible. Classification systems may entail a process of regularization that occurs across different contexts. Communicating across contexts with different classification systems may create tensions that lead to challenging communication and experiences, in some cases even to prejudice and discrimination. By computationally modeling these category membership phenomena, applications built with the system of the first embodiment involve changes of category over time (e.g., naturalization).

Membership is the experience of encountering and interacting with objects within certain social categories, and increasingly engaging in naturalized relationships with them, for example, as per Bowker and Star. Naturalization is the deepening familiarity of such interactions within a given social category. Marginalization is a result of enforced naturalization occurring in which members of a marginal category exist outside of social groups, or are less prototypical members of communities. Marginalization is also characterized by exclusion from a social category or an individual having multiple memberships and having to switch between the objects, interactions and protocols specific to each social category.

Stigma is constructed and maintained through social interaction and is generally associated with one or more attributes that are deemed socially discrediting, or perceived failings, shortcomings, or handicaps that a social group deems as undesirable within a particular social context. Examples of stigma may include differences of: (1) the physical body, (2) individual character, and (3) tribal classes of race, nation, and religion. Each of these categories of stigma may be described as deviance from those who do not depart negatively from the particular expectations at issue, or the "normals," as per Erving Goffman, for example.

Yet, in practice, a society may hold norms that are largely unattainable for any of its members. Impression management describes strategies for how the stigmatized (or the discredited) might enter into mixed contact with normals. Impression management involves a degree of self-surveillance and control where everyday actions and behaviors are scrutinized for how they might reveal a personal stigma. Because these stigmas are typically hidden or invisible, the stigmatized may develop a feeling of danger or anxiety that she or he will be "found out" by a normal. A number of impression management strategies used by stigmatized individuals, are summarized in Table 1.

TABLE 1

Strategies for Impression Management from Stigmatization

| Subcategory | Definition | Example | Degree of Passing |
| --- | --- | --- | --- |
| Covering | Diverting overt attention from the stigma. | Changing one's name or avoiding clothes associated with one's heritage. | Intentional passing |
| Disidentifiers | Positive signs used to throw doubt on the validity of a virtual identity. | An illiterate person wearing glasses. | Intentional passing |
| Status/prestige symbols; "points" | Behavioral or visual signs that make claims to prestige or normalcy. | Clear diction or insignia. | Intentional passing |
| Slipping | Furtive signs that discredit tacit claims to privilege. | One's true accent slipping through a façade. | Accidental non- or partial passing |
| Relationship distance management | Selectively reveal stigma to some groups | Only tell your good friends one's sexual orientation, reveal nothing to others. | Intentional partial-passing |
| Voluntary disclosure of stigma | Impression management to tension management | Wearing an insignia associated with a stigmatized group or acting as an advocate for the community. | Intentional non-passing |

A first exemplary system shown in FIG. 2 supports authoring conversational narratives of group membership in any social identity domain using a data-driven approach with three primary components: a platform engine 220, an application interface 240, and domain epistomologies 260.

Examples discussed herein under the first exemplary system include a "gatekeeper" RPG scenario and "music social network recommender," a social network type site (social narrative interface) in which virtual characters conversationally make music recommendations and respond to a users' changing musical preferences as the user responds to these recommendations (by listening to them, liking, disliking, et cetera).

The platform engine 220 includes a category membership module 224 providing a mathematical model of degrees of membership of a virtual identity across multiple categories. The platform engine 220 provides the functionality to calculate, modify, and simulate changes to category memberships and serves as the logical processing component for identity used by applications built with the system 200. The engine 220 models category membership of virtual identities as gradient values in relation to the membership values of more central members. This enables more representational nuance than binary statuses of member/nonmember. A description of the implementation of a narrative generation model 226 is described below.

The application interface 240 includes a visual interface 242 for user interaction and for experiencing the narratives related to the category membership changes driven by the engine 200. The application interface 240 preferably resembles a familiar RPG scenario, for example, involving a player engaging with an NPC gatekeeper in order to gain access to a keep. However, the interface 240 could also take multiple other forms, such as a social networking interface, a text-only interface, or a 3D virtual environment. The specific game interaction mechanics 244 are also defined within the application interface 240, for example, conversational dialogue rules. The separation between backend (platform engine 220) and front-end (application interface 240) provides the flexibility to easily "re-skin" any given implementation with a new visual interface.

The system 200 includes domain epistomologies 260. As mentioned above, the term "epistemology" refers to an ontology that describes a set of knowledge and beliefs. Hence, domain epistemologies 260 in the system 200 refer to the knowledge representations describing the categories being modeled. The data utilized by the system 200 to present these categories to users include both author specified assets such as artwork or a narrative, and data-driven assets, such an API call to YouTube to query for a video.

Figure 4:
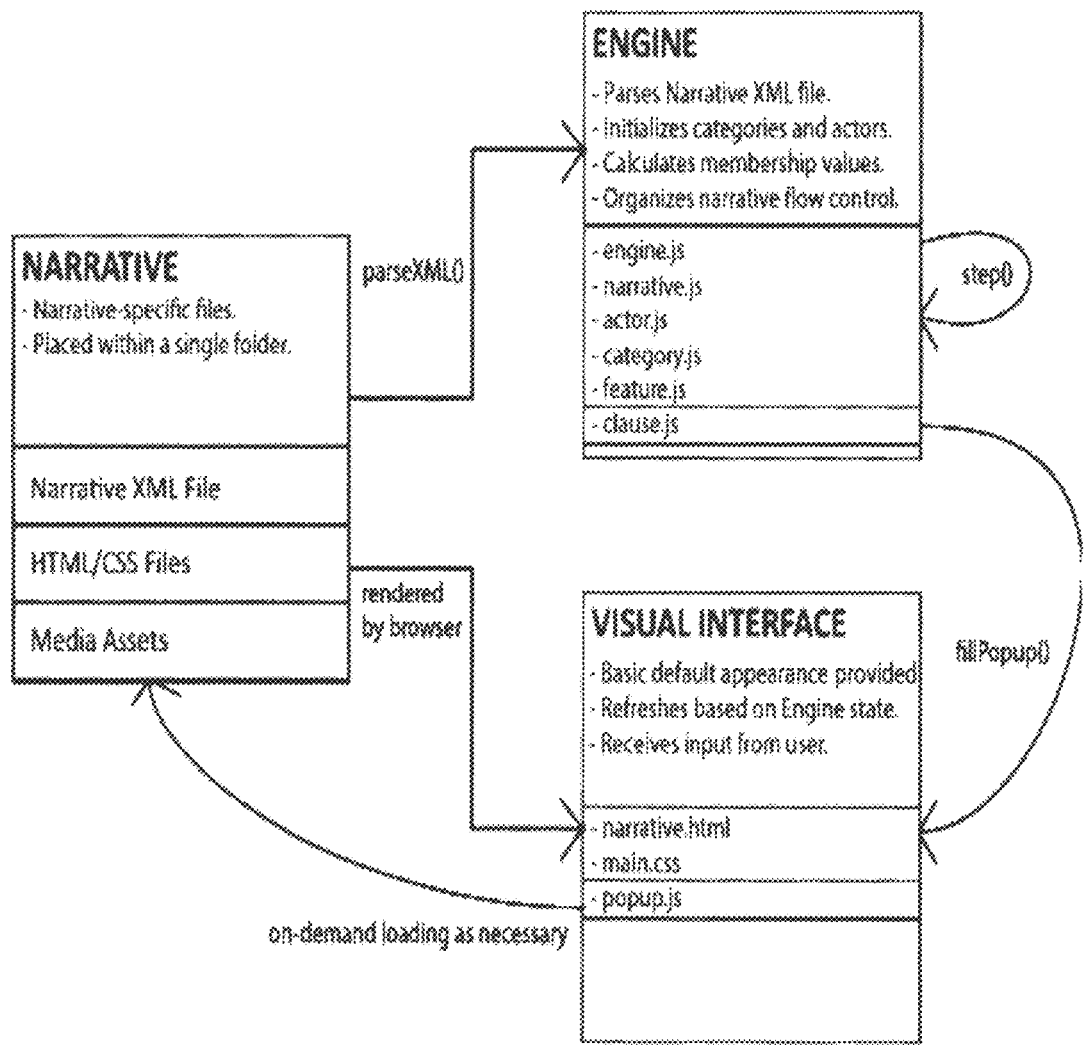
FIG. 4 is a block diagram of an exemplary system implementation overview.

As shown by FIG. 4, the platform engine 220 and application interface 240 may be implemented on a computer in an object oriented programming environment, for example, Javascript. The narratives may be specified separately, and contain, for example, a narrative XML file, HTML and/or CSS files. An asset folder may include media files including, for example, image and/or sound data.

Returning to FIG. 2, the platform engine 220 implements an artificial intelligence (AI) based system grounded in cognitive science theories of categorization, which implements an algorithmic model of degrees of membership of a user in multiple categories. Furthermore, the platform engine 220 is responsible for the generation of non-linear, socio-linguistic based conversational narratives to be experienced by users. The narrative structuring engine is general enough to implement an array of other types of narrative sequences, however. The distinct separation between the application interface 240 and the platform engine 220 confers the flexibility of using wholly different domains and visualizations (e.g., a social networking interface and a roleplaying game interface) while using the same underlying membership model and conversational narrative generation structure 226. The components of the platform engine 220 are described in more detail below.

In modeling categories, the platform engine 220 category membership model 224 incorporates and implements abstract (e.g., accepted and discredited) and concrete (e.g., elves and halflings) categories. This division offers the affordance of assigning concrete categories to abstract ones differently at run-time to encompass multiple worldviews. For example, in the simple case of an elf and halfling category elves may be accepted in one instance and discredited in another.

The system 200 supports any number of abstract and concrete categories, actors (e.g., PCs and NPCs), and features (attribute types such as height). To computationally model category gradience, the engine 220 computes a closeness value corresponding to the degree to which an actor deviates from a prototypical member of a category. A prototypical member is defined via a set of features. The closeness value for a given actor and category may be calculated as a function of the overlapping attributes in each feature. For discrete features (e.g., weapon skills), the number of overlapping attributes may determine closeness. For a continuous feature (e.g., height or speaking ability), the numeric similarity determines closeness. A normalization factor may be used to limit the final membership value within the range of 0 to 1, representing non-membership and a perfect match with a group's prototypical member respectively. The variance of the closeness value thus models centrality gradience. The degree of membership fluctuates throughout a narrative by the actions and choices made by the user. Attributes are added/removed (discrete features) or modified numerically (continuous features), which creates a fluctuating degree of membership and naturalization trajectory for the user.

For example, an exemplary closeness value used by a music social network embodiment of the first system may be $$\frac{1}{w}\left\{w_m \times \left(\frac{m(u) \cap m(c)}{m(c)}\right) + w_t \times \left(\frac{t(u) \cap t(c)}{t(c)}\right)\right\} \quad \text{(eq. 1)}$$

$$W = \frac{1}{w_m + w_t}$$

where m is moods, t=themes, u=user and c=category. Here, moods and themes refer to discrete features of music. Concrete categories represent fans of particular genres of music. User category membership is displayed through a photowall of artists, but can also be displayed through charts or through a 3D graphical avatar. Results of membership and naturalization tests may be conveyed through conversational dialogue and changes to the photowall or other user category representations.

The narrative generation model 226 of the platform engine 220 initializes the identity actors and categories for a given domain. For example, for setting the initial identity category of a user, the social media music recommender system may use a set of Facebook music "likes" to determine themes, moods, and genres associated with categories from an external database, while Gatekeeper uses author-specified attributes. A narrative experience then begins progressing over time and generating structured clauses using a formal schema based on personal experience. The purely structural aspects of this theory can be formalized as a grammar, instances of which correspond to the legal structures for narratives. Narrative generation is implemented according to a narrative structure specified by a simplified version of a finite state machine called the Linear Event Structure Machine (or probabilistic bounded stack transition machine).

The initial implementation of an automaton to structure narrative clauses may be relatively simple and may be used to instantiate an adapted version of William Labov's empirical model of the narrative structure of personal experience from sociolinguistics (Labov 1972). The format for specifying the automaton was designed in a way that is relatively easy for a polypoem author to specify.

Subsequent projects have necessitated the development of a more powerful machine to structure clauses, in particular to enable hierarchically organized and nested narrative structures. Toward this end, the "Event Structure Machine," technically referred to as a probabilistic bounded transition stack machine, was developed. The Event Structure Machine has the following format (in a modified extended BNF notation in which italicized phrases denote informal descriptions of atomic elements):

```
<Event Structure Machine> ::= "(structure" <clauses> ")"
<clauses> ::= <clause> {<clauses>}
<clause> ::= "(" <name> <number-pair> <subclause>
    <exit-to-clause> <read-flag> ")"
<name> ::= an atomic clause name
<number-pair> ::= ")" <minimum-number>
    <maximum-number> ")"
<subclause> ::= "("an atomic clause name ")" | "( )"
<exit-to-clause> ::= "(" an atomic clause name ")" | "( )"
<minimum-number> ::= a positive integer
<maximum-number> ::= a positive integer
<read-flag> ::= read | n
```

An important structure in this format is the <clause>. The functioning of the event structure machine can be understood by examining the components of these "clauses." A clause consists of a name, pair of integers, subclause name, exit-to clause name, and a read-flag. A clause may be interpreted as follows:
 1) The <name> is a symbol used for referring to the clause type. This name can be anything and does not necessarily refer to specific clause types from various linguistic or narrative theories.
 2) The <number-pair> consists of an integer indicating the minimum and maximum numbers of repetitions of the clause.
 3) The <subclause> refers to the subsequent nested clause type to be selected.
 4) The <exit-to-clause> refers to the subsequent clause type to be selected after all subclauses have been exhausted.
 5) The <read-flag> determines whether or not user-input is to first be read and taken into account when instantiating a phrase template of the selected clause type.

For example, an interactive poem *The Girl with Skin of Haints and Seraphs* (Harrell 2005) was reimplemented in the Event Structure Machine format as follows:

```
(structure
    (ori (1 1) ( ) narr read)
    (narr (3 5) eval coda read)
    (eval (0 1) ( ) ( ) n)
    (coda (1 1) ( ) ( ) read))
```

A possible poem output by such an automaton would have the following structure (with clause names standing in for actual clauses):

```
ori
narr,
    eval
narr,
    eval
narr,
    eval
coda
```

In this example the "eval" clauses are nested under the "narr" clauses, and there are three repeats of "narr, eval" pairs. Such structures can easily be elaborated to define more complexly structured output, e.g. simply changing the event structure clause from "(ori(1 1)( )narr read)" to "(ori(3 3)narr( )read)" would result in the output consisting of three full repetitions of the output structure in the example above.

The Linear Event Structure Machine operates upon a narrative specified here using extended Backus Naur Form (EBNF):

```
<Linear Event Structure Machine> ::=
    "<narrative>" <clauses> "</narrative>"
<clauses> ::= <clause> {<clauses>}
<clause> ::=
    "<narrative-element> <type>"
        <name> <number-pair>
    "</type> </narrative element>"
<name> ::= an atomic clause name
<number-pair> ::=
"<min>" <minimum-number> "</min>"
"<max>" <maximum-number> "</max>"
<minimum-number> ::= a positive integer
<maximum-number> ::= a positive integer
```

Figure 3:
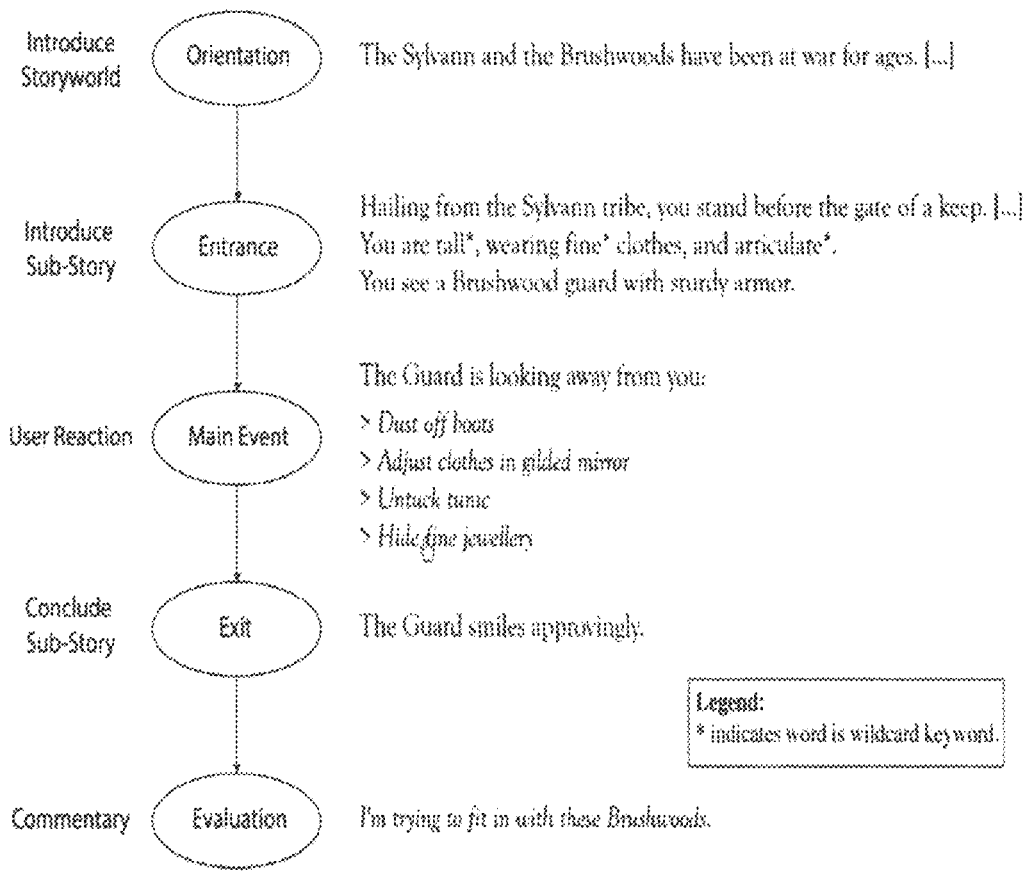
FIG. 3 is a flow diagram of a simplified narrative structure.

The linear event structure machine consists of a set of <clause> elements, and its functioning can be understood its components. Each consists of a name, pair of integers, subclause name, exit-to clause name, and a read-flag. A clause is to be interpreted as follows: Its name is a symbol used for referring to the clause type and can be anything, not necessarily referring to specific clause types from various linguistic or narrative theories. The number-pair consists of an integer indicating the minimum and maximum number of repetitions of the clause. FIG. 3 illustrates a simplified conversational narrative structure. Conversational narrative structures are instantiated by a database of narrative templates called content-clauses that are filled in with text content and wildcards. Wildcards are text elements that possess identity specifiers determined at run-time. Consider the (continuous) feature "clothing":

```
<feature name="Clothing" type="range" wildcard="c">
    <feature-range-labels>
        <label min='0' max='20'>ragged</label>
        <label min='20• max='40'>worn</label>
        <label min='40' max='60'>ordinary</label>
        <label min='60' max= '80'>tine</label>
        <label min='80' max='100'>exquisite</label>
    </feature-range-labels>
</feature>
```

A wildcard specifying the clothing value (c) of an actor or a category (A) would be *cA. Given a clothing value (e.g., 25), the wildcard is converted to the appropriate text descriptor (e.g., worn). As noted above, conditional tests constrain occurrences of each clause: Category membership tests specify the gradient membership threshold required within a social group (e.g., central, peripheral, or non-membership within a category), naturalization membership tests specify the trajectories of social group membership across all required groups (e.g., increasing, decreasing or fluctuating membership), and feature tests specify the attributes required for features (e.g., at least fine clothing and of tall height.) Main event clauses are capable of handling user responses. Each response includes text content (which may include wildcards), and fallouts, which consist of resultant effects from actor responses. A fallouts can directly modify a specific attribute or enact a more global change across all features with a specified intensity. The following is an example of such a clause type:

```
<main-event-clause>
    <id>300</id>
    <image>guard_stare.png</image>
    <feature-test>
        <test feature="Ability">You,stealing</test>
    </feature-test>
    <category-membership-test>
        <test min="50" max="80">Accepted</test>
    </category-membership-test>
    <naturalization-trajectory-test>
        <test naturalization="fluctuating">Accepted</test>
    </naturalization-trajectory-test>
    <content>The *rG Guard stares at you.</content>
    <actions>
        <action args="0">
            <text>Do nothing</text>
        </action>
        <action args="1">
            <text>Straighten up</text>
            <fallout>Height ,+10</fallout>
        </action>
        <action args="2">
            <text>Slouch</text >
            <fallout>Height, -10</fallout>
        </action>
    </actions>
</main-event-clause>
```

Here, id is a unique identifier, image is the graphic to be displayed, feature-test requires that the user (defined as "You" in this narrative) has the "stealing" ability, category-membership-test requires the user to be within the range of [50-80] in the Accepted (abstract) category, naturalization-trajectory-test requires that the user's membership be "fluctuating" in the Accepted (abstract) category, content specifies the text of the clause (*rG wildcard dynamically retrieves the Guard's "Race" feature), actions specify possible user choices, and fallout the consequences of each choice (here affecting the user's "Height"). More complex fallout specifications allow for category-relative consequences (e.g., Accepted, Height, +10 shifts the user's "Height" feature closer to the Accepted category by intensity 10), global category-relative consequences (e.g., Accepted, +10 shifts all user feature values closer to the Accepted category by intensity 10), and local attribute-specific consequences (e.g., Weapon, Axe adds the attribute "Axe" to the user's "Weapon" feature). The scalability in the first embodiment system 200 maximizes authorial influence by handling any number of user choices, choice consequences, and conditional tests for a given clause.

While the Gatekeeper example above is in the context of an RPG embodiment, the principles are generally applicable elsewhere, for example, for the social media music recommender system. For example, the behavior of others responding to a user of a virtual reality system may change based upon category changes, such as perception of the user in categories of happy person, calm person, fashionable person. This may further be driven by behavior of the user, for example, proximity to NPCs, gaze direction relative to NPCs, duration spent talking to NPCs, nods vs. headshakes, and so on.

As an example data-driven application of a model of group membership, the social media music recommender system uses musical identity (e.g., being a fan of a certain genre) as a test case. The music that people listen to is a vehicle for conveying "Music In Identities (MII)", wherein music is viewed as a "means for developing other aspects of our personal identities, including gender identity; youth identity; national identity; and disability and identity." Test cases narrate changes of social group membership related to musical identity as expressed via preferences in a social network.

The Platform Engine models category memberships of a user as gradient values in relation to the membership values of more central members, enabling more representational nuance than binary statuses of member/nonmember. For example, membership values may be calculated from music artist "likes" (binary indications of positive valuation) on the Facebook profile of a user, from which artists' moods (e.g., cheerful, gloomy, etc.), themes (e.g., adventure, rebellion, etc.), and styles (e.g., film score), may be extrapolated, and are used to express the identity of the user.

Figure 5:
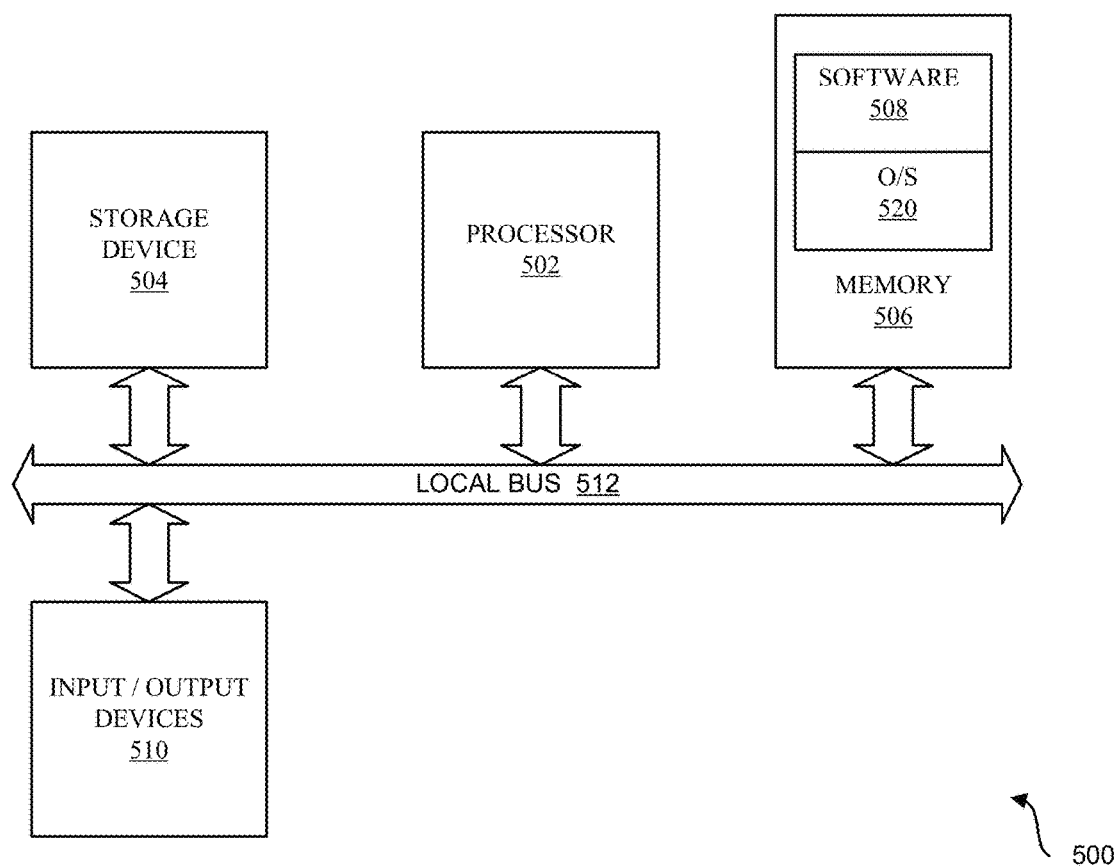
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
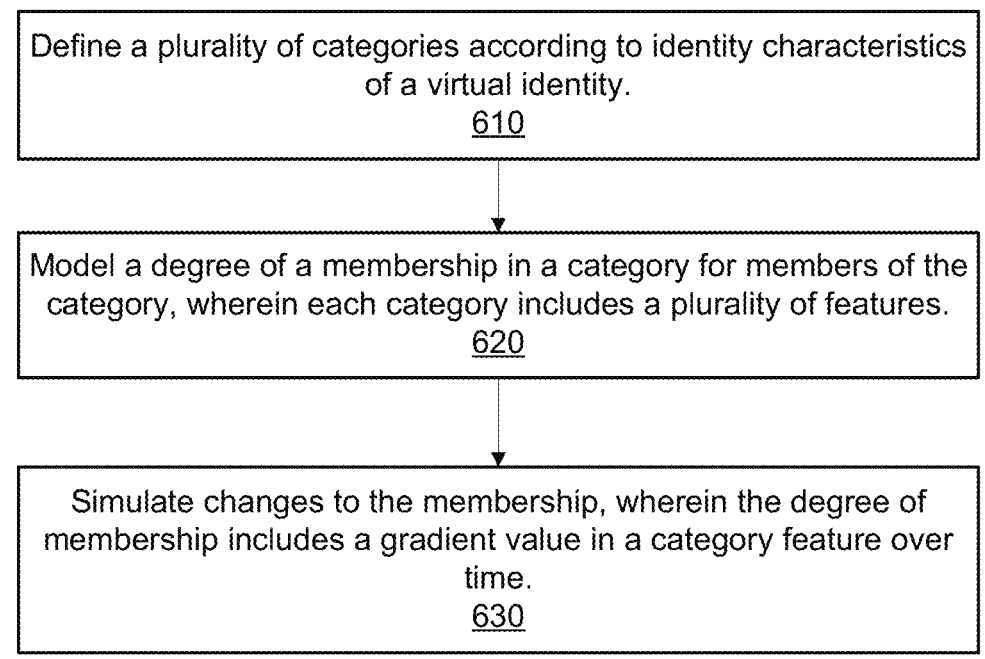
FIG. 6 is a flowchart of a first exemplary embodiment of a method for modeling an identity of a character in a digital media system.

FIG. 6 is a flowchart of a first exemplary embodiment of a method 600 for modeling an identity of a character in a digital media system having a processor and a memory storing non-transitory instructions for execution by the processor. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Figure 7A:
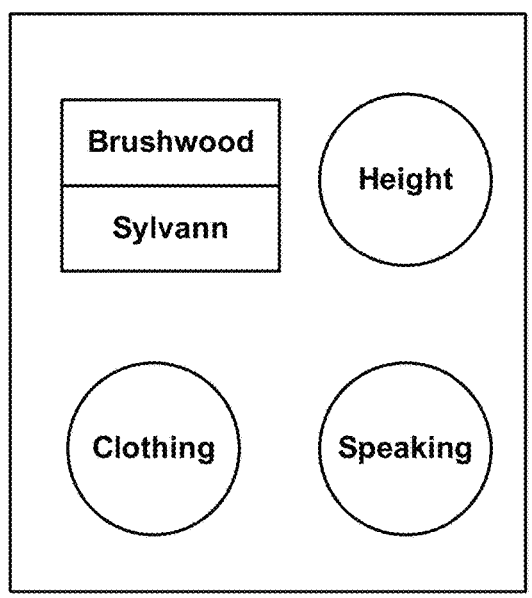
FIG. 7A is a block diagram of features of an exemplary category.

A plurality of categories are defined according to identity characteristics of a virtual identity, for example a PC, as shown by block 610. As described above, a category may be a concrete category or an abstract category. A degree of a membership in a category is modeled for members of the category, as shown by block 620. Each category includes a plurality of features. An exemplary concrete category is shown in FIG. 7A. The category is for the tribe of a character, and includes four features, including a tribe label, height, clothing and speaking. The tribe label is a discrete feature, having two allowable values, Brushwood or Sylvann. The height, clothing and speaking features are ranged features. FIG. 7B illustrates the features of a prototypical Brushwood, described as "a small people on average, are sometimes judged from afar to be fond of earthly homespun fabrics and good hearth tales. In contrast, FIG. 7C illustrates the features of a prototypical Sylvann, described as "a tall people on average, sometimes judged from afar to be lovers of finery and elaborate poetry." The tribe features of a particular PC, however, may not match either a prototypical Brushwood or a prototypical Sylvann. This is a result of category gradience (described above). For example, FIG. 8A illustrates a variance of a PC Brushwood from the prototypical Brushwood in one feature, namely height. FIG. 8B illustrates a variance of a PC Brushwood in three features (height, clothing, and speaking).

NPC characters therefore may interact differently with the PC of FIG. 8A and the PC of FIG. 8B based upon how the NPC is programmed to respond to one or more of the category features. For example, the NPC may interact with the PC of FIG. 8B in a manner closer to that of a prototypical Sylvann, rather than that of a prototypical Brushwood, even though the character is of the Brushwood tribe. The PC of FIG. 8B may be said to pass as a Sylvann with some NPCs.

Changes to the membership may be simulated, wherein the degree of membership includes a gradient value in a category feature over time, as shown by block 630. For example, an acceptance threshold may be determined by a combination of feature levels wherein an NPC will react to a PC as a Sylvann rather than a Brushwood, or where the Brushwood "passes" as a Sylvann. For example, the Sylvann/Brushwood acceptance threshold may change as the clothing and speaking styles of a PC changes over time, as shown in FIGS. 9A-9D. As shown in FIG. 9E, the dark dashed line represents the trajectory of the category gradient values over time, indicating that the Brushwood PC would not pass as a Sylvann at times 0, 1, and 2, as the trajectory is below the acceptance threshold. However, the Brushwood PC would pass as a Sylvann at time 3, as the trajectory is above the acceptance threshold. The trajectory may be determined based upon a single feature, or may be based upon a combination of features. Therefore, the trajectory maps dynamic group membership of a PC.

The trajectory shown in FIG. 9E is constant (has a slope with a straight line), but other trajectories are possible. FIGS. 10A-10D show the clothing and speaking manners of a PC fluctuating at different points in time, resulting in the trajectory being below the acceptance threshold at times 0 and 2, but above the acceptance threshold at times 1 and 3.

The value of a ranged feature may vary based on the actions of the PC. For example, a Brushwood PC choosing to wear fine clothing may result in an increase in the level of the clothing feature of the category, possibly altering whether the trajectory is above the acceptance threshold. Since an NPC may react to the PC differently depending upon whether the trajectory is above or below the acceptance threshold, the decision of the PC to wear fine clothing may impact the narrative of the game. Similarly, the manner of speaking of the PC interacting with an NPC may likewise affect the trajectory. Therefore, the method results in an output, such as the visual presentation of a reaction of an NPC to a PC on a visual interface, such as a computer screen. Other outputs are also possible, for example, the system choosing a first hyperlink over a second hyperlink to present on a visual interface as a result of the trajectory map.

Figure 11:
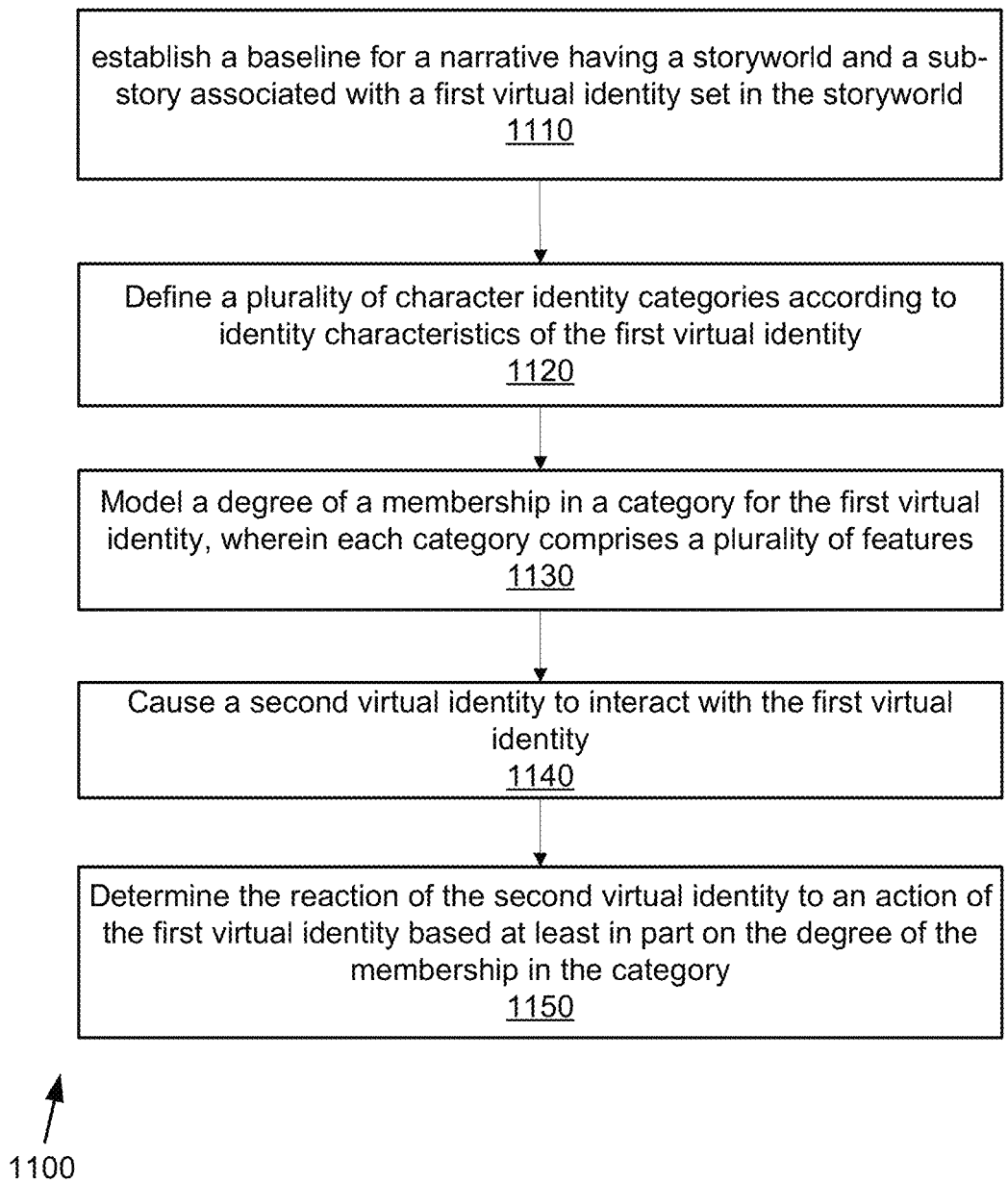
FIG. 11 is a flowchart of a second exemplary embodiment of a method for simulating a narrative structure.

FIG. 11 is a flowchart of a second exemplary embodiment of a method 1100 for simulating a narrative structure in a digital media system having a processor and a memory.

A baseline for the narrative is established having a storyworld and a sub-story associated with a first virtual identity set in the storyworld as shown by block 1110. This corresponds to the orientation and entrance bubbles in FIG. 3. A plurality of character identity categories are defined according to identity characteristics of the first virtual identity as shown by block 1120. A degree of a membership in a category for the first virtual identity is modeled, wherein each category comprises a plurality of features, as shown by block 1130. These features may be initially modeled based at least in part on the sub-story, and may be changed over time based upon the actions of the first virtual identity. These features may also be initially seeded based on external factors, for example, preferences or associations of a user controlling the first virtual identity as indicated in the profile of the user or actions of a user in a social media venue, such as Facebook or Twitter. For example, the preferences of a user regarding music or videos may influence feature values.

A second virtual identity, for example, an NPC, is caused to interact with the first virtual identity, as shown by block 1140. This corresponds to the main event bubble in FIG. 3. A reaction of the NPC to an action of the first virtual identity is determined based at least in part on the degree of the membership in the category as shown by block 1150. This corresponds to the exit bubble in FIG. 3. A narrative branch of a plurality of branches within the narrative is selected as a result of the NPC reaction, as shown by block 1150. For example, the interaction between the first virtual identity and the NPC may result in the selection of one of two branches in the overall narrative, such as whether the NPC will allow the first virtual identity to enter a region within the narrative.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital media system modeling social categories of a virtual identity, comprising: an engine comprising a processor and a memory configured to execute the non-transitory steps of: defining a plurality of modeling categories according to identity characteristics of the virtual identity; modeling a degree of a membership in a category for a member of the category, wherein each category comprises a plurality of features shared in varying degrees by one or more members of the category that impact interactions with other virtual identities; and simulating changes to the membership; and determining a naturalization trajectory comprising a change of the degree of membership in a category over time of the virtual identity, wherein the degree of membership comprises a gradient value in a category feature; an application interface comprising an interactive graphical interface representing a visual representation of user interaction and category membership that dynamically changes as category membership changes; and an epistemology configured to store and retrieve the features of the category.

2. The system of claim 1, wherein simulating changes to the membership of the category further comprises modifying the gradient value in the category feature in response to an action of the virtual identity.

3. The system of claim 1, wherein simulating changes to the membership of the category further comprises modifying the gradient value in the category feature in response to social media data related to a user of the digital media system.

4. The system of claim 1, further comprising the step of modeling a response of a second virtual identity to an action of a first virtual identity based in part on the degree of the membership of the first virtual identity in the category.

5. The system of claim 4, further wherein the response of the second virtual identity is further based in part on a worldview of the second virtual identity.

6. The system of claim 4, wherein a worldview of the second virtual identity comprises an instantiation of an abstract category with a concrete category.

7. The system of claim 6, wherein the worldview of the second virtual identity further comprises a specification of a membership function and/or a membership threshold.

8. The system of claim 5, wherein the worldview of the second virtual identity changes as a function of time.

9. The system of claim 1, further comprising the step of determining a closeness value corresponding to a degree in which a virtual identity deviates from a prototypical category member.

10. The system of claim 1, wherein the category is selected from the group consisting of an abstract category and a concrete category.

11. The system of claim 1, wherein the virtual identity is a player character (PC) of a role playing game (RPG).

12. The system of claim 11, further comprising the step of determining the response of a non-player character (NPC) to an action of the PC based in part on the degree of the membership in the category.

13. The system of claim 1, wherein simulating changes to the membership of the category further comprises modifying the gradient value in the category feature in response to a detected behavior and/or disposition of the user.

14. A method for modeling a virtual identity in a digital media system comprising a processor and a memory storing non-transitory instructions for execution by the processor, comprising the steps of: defining a plurality of categories according to identity characteristics of a virtual identity; modeling a degree of a membership in a category for members of the category, wherein each category comprises a plurality of features shared in varying degrees by one or more members of the category that impact interactions with other virtual identities; simulating changes to the membership; and determining a naturalization trajectory comprising a change of the degree of membership in a category over time of the virtual identity, wherein the degree of membership comprises a gradient value in a category feature over time, and simulating changes to the membership further comprises via an application interface comprising an interactive graphical interface representing user interaction and category membership that dynamically changes as category membership changes.

15. The method of claim 14, wherein simulating changes to the membership of the category further comprises modifying the gradient value in the category feature in response to an action of the virtual identity.

16. The method of claim 14, wherein simulating changes to the membership of the category further comprises modifying the gradient value in the category feature in response to social media data related to a user of the digital media system.

17. The method of claim 14, further comprising the step of modeling a response of a second virtual identity to an action of a first virtual identity based in part on the degree of the membership of the first virtual identity in the category.

18. The method of claim 17, further wherein the response of the second virtual identity is further based in part on a worldview of the second virtual identity.

19. A method for simulating a narrative structure in a digital media system comprising a processor and a memory storing non-transitory instructions for execution by the processor, comprising the steps of: establishing a baseline for a narrative comprising a story world and a sub-story associated with a first virtual identity set in the story world; defining a plurality of identity categories according to identity characteristics of the first virtual identity; modeling a degree of a membership in a category for first virtual identity, wherein each category comprises a plurality of features; causing a second virtual identity to interact with the first virtual identity; determining the reaction of the second virtual identity to an action of the first virtual identity based at least in part on the degree of the membership in the category; via an application interface comprising an interactive graphical interface, representing user interaction and category membership that dynamically changes as category membership changes; and selecting a narrative branch of a plurality of branches within the narrative is selected as a result of the second virtual identity reaction.

20. The method of claim 19, wherein the digital media system comprises a role playing game (RPG), the first virtual identity comprises a player character of the RPB, and the second virtual identity comprises a non-player character of the RPG.

* * * * *